United States Patent

Ikura et al.

[11] Patent Number: 5,543,587
[45] Date of Patent: Aug. 6, 1996

[54] INPUT UNIT

[75] Inventors: Kenichlro Ikura; Masakazu Miura, both of Kyoto, Japan

[73] Assignee: Nissha Printing Co., Ltd., Kyoto, Japan

[21] Appl. No.: 948,593

[22] Filed: Sep. 23, 1992

[30] Foreign Application Priority Data

Sep. 25, 1991 [JP] Japan ..................... 3-274747

[51] Int. Cl.⁶ ............................. G08C 21/00
[52] U.S. Cl. ............................. 178/18
[58] Field of Search ............. 178/18, 19; 345/179

[56] References Cited

U.S. PATENT DOCUMENTS

| | | | |
|---|---|---|---|
| 4,071,689 | 1/1978 | Talmage et al. | 178/18 |
| 4,672,153 | 6/1987 | Kikuchi | 178/18 |
| 4,695,680 | 9/1987 | Kable | 178/19 |
| 4,700,025 | 10/1987 | Hatayama et al. | 200/5 A |
| 4,786,767 | 11/1988 | Kuhlman | 200/5 A |
| 4,798,919 | 1/1989 | Miessler et al. | 178/18 |
| 4,821,890 | 4/1989 | Hills | 211/18 |
| 4,836,379 | 6/1989 | Shaw | 206/523 |
| 4,893,115 | 1/1990 | Blanchard | 345/174 |
| 4,934,470 | 6/1990 | Berthold et al. | 178/18 |
| 4,983,787 | 1/1991 | Kunikane | 178/18 |
| 5,010,213 | 4/1991 | Moriwaki et al. | 178/18 |
| 5,127,050 | 6/1992 | Takahaski et al. | 379/428 |

FOREIGN PATENT DOCUMENTS

| | | |
|---|---|---|
| 0419145 | 3/1991 | European Pat. Off. . |
| 0435438 | 7/1991 | European Pat. Off. . |
| 3413313 | 8/1984 | Germany . |
| 3-70638 | 7/1991 | Japan . |

*Primary Examiner*—Stephen Chin
*Assistant Examiner*—Kevin Kim
*Attorney, Agent, or Firm*—Wenderoth, Lind & Ponack

[57] ABSTRACT

An input unit includes a transparent touch panel wherein a fixed electrode supporting body having a fixed electrode formed on one surface thereof and a film having a movable electrode formed on one surface thereof are arranged so that the respective electrodes face each other and are spaced apart. The input also includes an input pen having an end thereof formed of polyolefin resin.

7 Claims, 1 Drawing Sheet

INPUT UNIT

BACKGROUND OF THE INVENTION

The present invention relates to an input unit including a transparent touch panel disposed on a display of a liquid crystal display device or the like, and an input pen for handwriting and inputting coordinates.

In a conventional example of an input unit having a transparent touch panel on a display of a liquid crystal display device and an input pen for handwriting and inputting coordinates, the transparent touch panel is comprised of, for example, a supporting body having a fixed electrode formed on one surface thereof, and a film also having a movable electrode formed on one surface thereof. The supporting body and the film are spaced from each other by a slight distance via spacers while the respective surfaces where the electrodes are formed are opposed to each other. A hard coating layer is formed to protect the surface of the transparent touch panel as necessary.

The input pen is used to handwrite and input coordinates of minute information, that is, characters, figures or the like to the surface of the above film at the side of the movable electrode. For this purpose, an end of the input pen is formed of a resin such as nylon, polyacetal, polyamide, or the like so as to prevent damage to the transparent touch panel and to input the coordinates reliably.

In the conventional input unit described above, since the end of the input pen repeatedly slides against the surface of the transparent touch panel when the information is input, it causes abrasion and damage to the surface of the transparent touch panel.

Even when the surface of the transparent touch panel is coated with the hard coating layer, it sometimes happens that the input pen scratches and delaminates the hard coating layer of the transparent touch panel.

If the end of the input pen is formed of a soft material such as rubber, it is possible to reduce the damage to the transparent touch panel. However, the end of the input pen cannot be prevented from being quickly worn out; and therefore, the input pen is short-lived. What's worse, the end of the input pen is bent when it is pressed against the surface of the transparent touch panel, making it difficult to correctly input coordinates.

SUMMARY OF THE INVENTION

The object of the present invention is therefore to provide an input unit capable of preventing the surface of a transparent touch panel from being worn and damaged even if the end of the input pen repeatedly slides against the surface of the transparent touch panel.

In accomplishing these and other objects, according to one aspect of the present invention, there is provided an input unit comprising:

a transparent touch panel wherein a fixed electrode supporting body having a fixed electrode formed on one surface thereof and a film having a movable electrode formed on one surface thereof are arranged so that the respective electrodes are spaced apart via spacers; and face each other an input pen having an end thereof formed of polyolefin resin.

BRIEF DESCRIPTION OF THE DRAWING

This and other objects and features of the present invention will become clear from the following description taken in conjunction with the preferred embodiment thereof with reference to the accompanying drawing in which.

DETAILED DESCRIPTION OF THE PREFERRED EMBODIMENT

Figure 1:
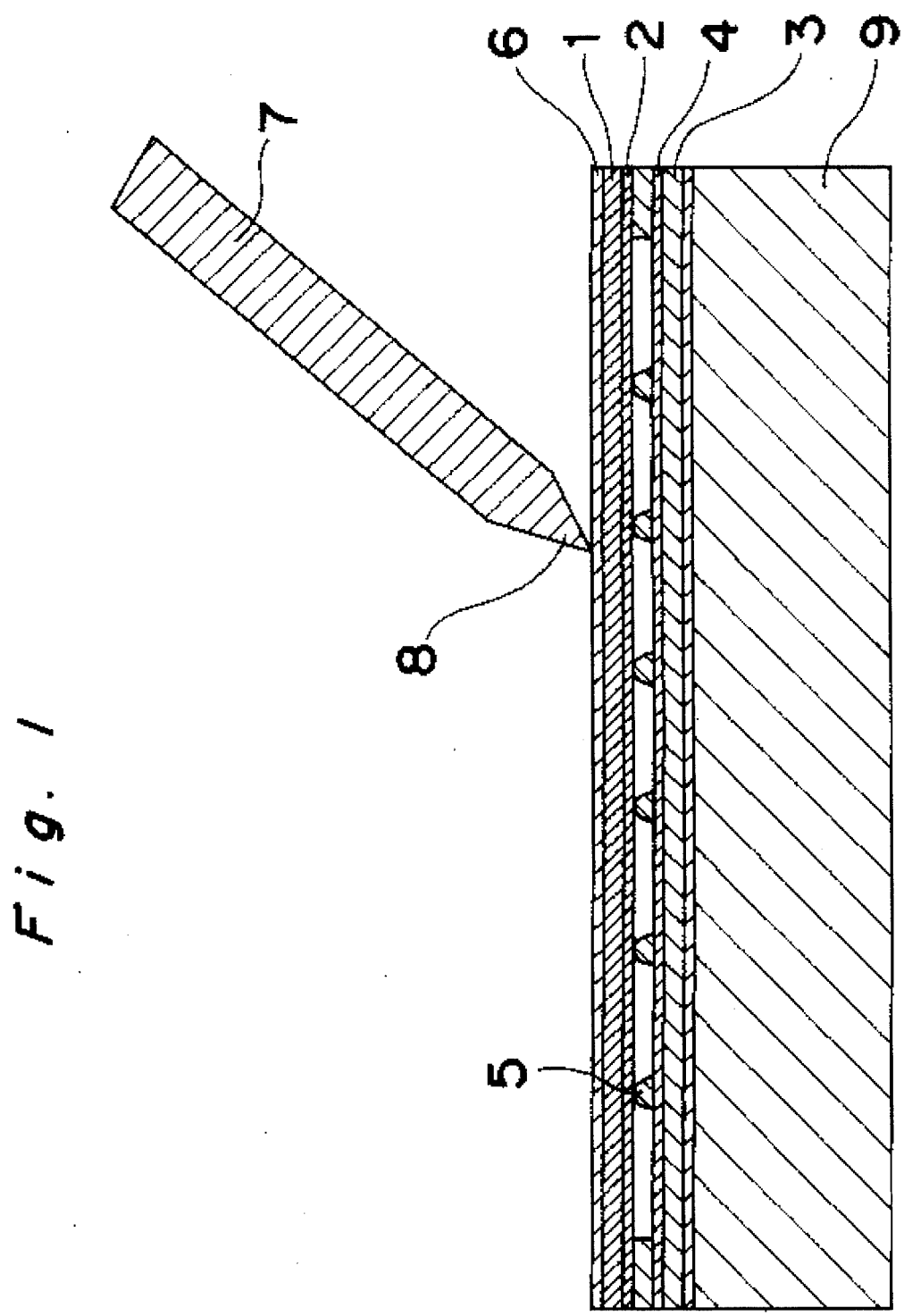
FIG. 1 is a cross sectional view of an input unit according to one preferred embodiment of the present invention.

Now, the present invention will be described in detail with reference to the accompanying drawing.

FIG. 1 is a cross sectional view of an input unit according to a preferred embodiment of the present invention, wherein reference numerals respectively indicate: 1 a film at the side of a movable electrode; 2 a movable electrode; 3 a fixed electrode supporting body; 4 a fixed electrode; 5 a spacer; 6 a hard coating layer; 7 an input pen; 8 an end portion of the input pen 7; and 9 a liquid crystal display device.

In a transparent touch panel constituting the input unit of the present embodiment, the fixed electrode 4 is formed on one surface of the fixed electrode supporting body 3, and the movable electrode 2 is formed on one surface of the film 1. The supporting body 3 and the film 1 are opposed to each other and are spaced apart via the spacers 5 at the respective surfaces where the electrodes are formed.

The film 1 is made of a transparent film, for example, a polyester film or a polyethyleneterephthalate film. The thickness of the film 1 is preferably approximately 125 μm.

The movable electrode 2 is formed at the lower surface of the film 1. The movable electrode 2 is a transparent conductive film of indium tin oxide (ITO) or the like. An analog-type electrode where the input region is totally covered with the conductive film, or a digital-type electrode having the conductive film formed in striped patterns is used for the movable electrode 2.

The fixed electrode supporting body 3 is formed of a transparent film or transparent glass. For instance, a polyester film or a glass plate can be used as the supporting body 3.

The fixed electrode 4 is formed on the upper surface of the fixed electrode supporting body 3 by using a transparent conductive film of, e.g., ITO. Similar to the movable electrode 2, the fixed electrode 4 can be an analog-type or a digital-type electrode.

The spacers 5 maintain a slight distance between the movable electrode 2 and the fixed electrode 4. In general, the spacers 5 are formed on either of the movable and fixed electrodes 2, 4. A transparent resin, for example, photosensitive acryl or photosensitive polyester is formed in the shape of fine dots according to a photoprocessing method to obtain the spacers 5. The spacers 5 can be realized by forming many fine dots according to a printing method.

An adhesive is applied to either or both of the peripheries of the lower surface of the film 1 and the upper surface of the supporting body 3 which do not serve as input regions, or a pressure sensitive adhesive double coated tape is attached thereto, thus completing the transparent touch panel of the embodiment.

If necessary, the hard coating layer 6 may be formed on the upper surface of the film 1. An inorganic material such as a siloxane resin or an organic material such as an acryl epoxy resin is used for the hard coating layer 6. It is suitable that the hard coating layer 6 has a thickness of 1–2 μm.

The input pen 7 is provided so as to handwrite and input data to the transparent touch panel of the above-described structure. At least the end 8 of the input pen 7 is formed of a polyolefin resin, more preferably, polyethylene, polypropylene, a modified polyethylene or a modified polypropylene. It is possible to form the whole of the input pen 7 of the above material. The end 8 of the input pen 7 properly has a Rockwell hardness of 40–95 according to R scale.

The transparent touch panel operates so that a resistance of the transparent touch panel between the movable and fixed electrodes 2 and 4 varies according to a location where the end 8 of the input pen 7 touches the surface of the transparent touch panel.

As one example of the embodiment, a polyester film of 125 μm thickness is used as the film 1, and one surface of the film 1 is wholly covered with a transparent ITO conductive film to form the movable electrode 2. Moreover, glass of 1.1mm thickness is used as the fixed electrode supporting body 3. A transparent conductive film of ITO is formed all over one surface of the supporting body 3 to obtain the fixed electrode 4. Furthermore, the spacers 5 are formed of a photosensitive acrylic resin on the fixed electrode 4 in the photoprocessing method. The diameter of each spacer 5 is 40 μm. Then, a transparent acrylic adhesive is applied to the peripheries of the lower 10 surface of the film 1 and the upper surface of the supporting body 3 except for the input regions. The film 1 and the supporting body 3 are bonded so that the movable electrode and the fixed electrode face each other. In this manner, the transparent touch panel is obtained. The input pen is obtained by an injection molding method. The input pen is totally formed of polypropylene. Even if a katakana is input 100,000 times at the same place on the surface of the transparent touch panel by use of the input pen, the surface of the transparent touch panel is not damaged. The input pen itself produces hardly any abrasion.

As a comparative example, as shown in the Table 1, an input pen is formed of a material other than polyolefin resin. More specifically, in comparative examples 1–7, polyoxymethylene, polyamide, polyester elastomer, polystyrene, polycarbonate, polyphenyl sulfide, and tetrafluoroethylene are used, respectively.

The damage to the surface of the transparent touch panel and the abrasion of the input pen in the comparative examples are evaluated and compared after a katakana is input 100,000 times at the same place of the comparative transparent touch panel in the same structure as the embodiment, the result of which is shown in Table 1 below.

TABLE 1

|  | Material of input pen | Damage of transparent touch panel | Abrasion of input pen |
| --- | --- | --- | --- |
| Embodiment | polypropylene | o | o |
| Comparative example 1 | polyoxymethylene | x | o |
| Comparative example 2 | polyamide | x | o |
| Comparative example 3 | polyester elastomer | o | x |
| Comparative example 4 | polystyrene | Δ | x |
| Comparative example 5 | polycarbonate | x | x |
| Comparative example 6 | polyphenyl sulfide | x | x |
| Comparative example 7 | tetrafluoroethylene | x | x |

Wherein o: damage or abrasion hardly generated,

Δ: damage or abrasion generated, but within tolerance limits, x: too much damage or abrasion generated for the member to be used.

As described hereinabove, the input unit of the embodiment is comprised of the transparent touch panel wherein the fixed electrode supporting body having the fixed electrode on one surface thereof and the film having the movable electrode formed on one surface thereof are arranged in a manner that the respective electrodes confront each other and are spaced apart via the spacers, and the input pen having the end 8 formed of polyolefin resin.

Accordingly, even if the end of the input pen repeatedly slides against the surface of the transparent touch panel when the coordinates are to be input, the surface of the transparent touch panel is not worn and damaged.

The hard coating layer is not delaminated even when it is formed on the surface of the transparent touch panel.

Since the end of the input pen is not worn out, the life of the input pen is lengthened.

At the same time, since the end of the input pen is not bent even when the input pen is pressed against the surface of the transparent touch panel in order to input the coordinates, the coordinates can be input correctly.

Although the present invention has been fully described in connection with the preferred embodiment thereof with reference to the accompanying drawing, it is to be noted that various changes and modifications are apparent to those skilled in the art. Such changes and modifications are to be understood as included within the scope of the present invention as defined by the appended claims unless they depart therefrom.

What is claimed is:

1. An input unit comprising:
   a transparent touch panel wherein a fixed electrode supporting body having a fixed electrode formed on a first surface thereof and a film having a movable electrode formed on a first surface thereof are arranged so that said movable electrode and said fixed electrode face each other and are spaced apart from one another by spacers; and
   an input pen having an input end thereof formed of polyolefin resin for making it difficult to cause damage of said transparent touch panel and abrasion of said input end of said input pen.

2. The input unit as defined in claim 1, wherein the transparent touch panel operates so that a resistance of the transparent touch panel between the movable and fixed electrodes varies according to a location where the end of the input pen touches a surface of the transparent touch panel.

3. The input unit as defined in claim 1, wherein a hard coating layer is formed on a second surface of the film.

4. The input unit as defined in claim 1, wherein said input pen constitutes a means for varying a resistance between said movable electrode and said fixed electrode of said transparent touch panel when said input pen is contacted against a surface of said transparent touch panel and the location at which said input pen contacts said surface of said transparent touch panel is varied.

5. The input unit as defined in claim 1, wherein the polyolefin resin forming the end of the input pen comprises polyethylene or polypropylene.

6. The input unit as defined in claim 3, wherein said hard coating layer is formed of siloxane resin or acryl epoxy resin.

7. An input unit as defined in claim 1, wherein said input pen is formed entirely of pololefin resin.

* * * * *